United States Patent [19]

Wu et al.

[11] Patent Number: 4,987,375
[45] Date of Patent: Jan. 22, 1991

[54] CARRIER LOCK DETECTOR FOR A QAM SYSTEM

[75] Inventors: Kuang-Tsan Wu; John D. McNicol, both of Nepean, Canada

[73] Assignee: Northern Telecom Limited, Montreal, Canada

[21] Appl. No.: 480,384

[22] Filed: Feb. 15, 1990

[51] Int. Cl.$^5$ .............................................. H04L 27/38
[52] U.S. Cl. .................................. 329/309; 329/310; 331/DIG. 2; 375/81; 375/120
[58] Field of Search ............................... 329/304–309; 375/39, 81, 120; 331/DIG. 2

[56] References Cited

U.S. PATENT DOCUMENTS 4,736,386 4/1988 Nichols .................................. 375/10
4,855,692 8/1989 Kennard et al. ...................... 332/17

OTHER PUBLICATIONS

Article entitled, "Digital Amplitude–Phase Keying with M-ary Alphabets", by C. Melvil Thomas et al., IEEE Transactions on Communications, Feb. 1974, pp. 168–179.

Primary Examiner—Siegfried H. Grimm
Attorney, Agent, or Firm—R. John Haley; Dallas F. Smith

[57] ABSTRACT

A carrier lock detector for a quadrature amplitude modulation system includes Exclusive-OR gating circuits for determining when detected signal points occur within first areas centered on signal point positions in a phase plane diagram or second areas between the signal point positions, and for producing corresponding output signals. An integrated difference between these output signals is produced by an integrator and compared with a threshold level to provide a carrier lock detection signal. The arrangement is such that the integrated difference is substantially zero when the carrier is unlocked, so that the threshold level can be set to a low value to enable reliable operation of the detector at low signal-to-noise ratios.

9 Claims, 3 Drawing Sheets

CARRIER LOCK DETECTOR FOR A QAM SYSTEM

This invention relates to a carrier lock detector for a QAM (Quadrature Amplitude Modulation) system, such as is commonly used in microwave radio communication systems.

It is well known in microwave radio communication systems to use QAM, in which two carrier signals in phase quadrature are amplitude modulated by modulating signals, and are subsequently combined for transmission. Each transmitted symbol can thus have any one of a relatively large number of phase and amplitude states, which are generally represented by signal points in a signal point constellation in a phase plane diagram. Preferred signal point constellations have $2^n$ signal points arranged in a rectangular array within a circular boundary, n being a positive integer.

For example, Kennard et al. U.S. Pat. No. 4,855,692 issued Aug. 8, 1989 and entitled "Method of Quadrature-Phase Amplitude Modulation" specifically describes such signal point constellations for the cases of n=8 (256-QAM) and n=10 (1024-QAM). Kennard U.S. patent application Ser. No. 359,917 filed June 1, 1989 and having the same title specifically describes such a signal point constellation for the case of n=9 (512-QAM). The same principles are applicable to higher values of n, and signal point constellations with smaller values of n, for example for 16-, 32-, 64-, and 128-QAM, with signal points in rectangular arrays are described for example in "Digital Amplitude-Phase Keying with M-ary Alphabets" by C. Melvil Thomas et al., IEEE Transactions on Communications, Feb. 1974, pages 168–179.

In all such QAM systems, it is necessary for a phase locked loop in the receiver to be locked to the carrier phase in order to enable the modulated signals to be correctly decoded. This is referred to as carrier lock. In microwave radio communications systems, fading is a common and well-known phenomenon. During a fade, the signal-to-noise ratio (SNR) of the received signal falls to a low level, such that the signal and/or carrier lock may be lost. At the end of a fade, when the SNR rises again, carrier lock must first be established before the signal can be correctly decoded. To this end, it is known to provide a carrier lock detector which enables the decoder only when carrier lock is detected.

It is desirable to maintain carrier lock, and to detect carrier lock reliably, at the lowest possible levels of SNR, so that the system can tolerate deep fades with minimal loss of decoded data.

In Nichols U.S. Pat. No. 4,736,386 issued Apr. 5, 1988 and entitled "Carrier Out-of-Lock Detector Apparatus" there is described a carrier lock detector which is responsive to I and Q (in-phase and quadrature) amplitude error bits to provide an out-of-lock indication when, on average, more than half of the detected I and Q amplitudes are in error. An out-of-lock condition can be envisaged as a situation in which the detected signal point positions rotate about the I and Q axes of the phase plane diagram, the rate of rotation of the detected signal point positions being dependent upon the carrier phase error.

A disadvantage of this known carrier lock detector is that, at low levels of SNR such as occur during fading, it can indicate an out-of-lock condition even though the carrier is still locked. For example, for a 512-QAM system such a known detector fails to operate correctly for SNR less than about 29 dB, whereas it is desirable to have a detector which operates correctly at lower levels of SNR, for example down to about 25 dB.

Accordingly, an object of this invention is to provide an improved carrier lock detector.

According to one aspect this invention provides a carrier lock detector for a QAM system having signal points identified by a plurality of I bits and a plurality of Q bits respectively representing in-phase and quadrature-phase component amplitudes in a phase plane diagram, the phase plane diagram including first areas centered on respective signal points and second areas between the first areas, the detector comprising: means responsive to a plurality of less significant I bits and a plurality of less significant Q bits for producing a first signal when a detected signal is in one of the first areas and a second signal when a detected signal is in one of the second areas; means for producing an integrated difference of the first and second signals; and means for comparing the integrated difference with a threshold level to provide a carrier lock detection signal.

In contrast to the known arrangement, in a carrier lock detector according to the invention an integrated difference between the first and second signals is produced and compared with a threshold level to provide carrier lock detection.

For a QAM system having signal points in a rectangular array, preferably the means responsive to the less significant I and Q bits comprises Exclusive-OR gating means responsive to two less significant I bits, Exclusive-OR gating means responsive to two less significant Q bits, and AND gating means responsive to outputs of the two Exclusive-OR gating means for producing the first signal. This means conveniently further comprises AND gating means responsive to inverted outputs of the two Exclusive-OR gating means for producing the second signal.

In order to provide the greatest possible distinction between carrier locked and unlocked states, advantageously the means for producing an integrated difference of the first and second signals is arranged for producing a substantially zero integrated difference in a carrier unlocked state of the QAM system.

The invention also provides a method of detecting carrier lock in a QAM system in which signal points are identified by a plurality of I bits and a plurality of Q bits respectively representing in-phase and quadrature-phase component amplitudes in a phase plane diagram, comprising the steps of: monitoring a plurality of less significant I bits and a plurality of less significant Q bits to produce a first signal when a detected QAM signal is in one of first areas of the phase plane diagram centered on respective signal points and to produce a second signal when a detected QAM signal is in one of second areas of the phase plane diagram between and distinct from the first areas; providing an integrated difference of the first and second signals; and comparing the integrated difference with a threshold level to provide a carrier lock detection signal.

For a QAM system having signal points in a rectangular array, conveniently the second areas are diagonally offset from and the same size as the first areas. If the first and second areas are rectangular, production of the first and second signals is facilitated easily by the use of Exclusive-OR gates.

Preferably the step of providing an integrated difference of the first and second signals comprises providing a substantially zero integrated difference in a carrier unlocked state of the QAM system.

The invention will be further understood from the following description with reference to the accompanying drawings, in which.

Figure 1:
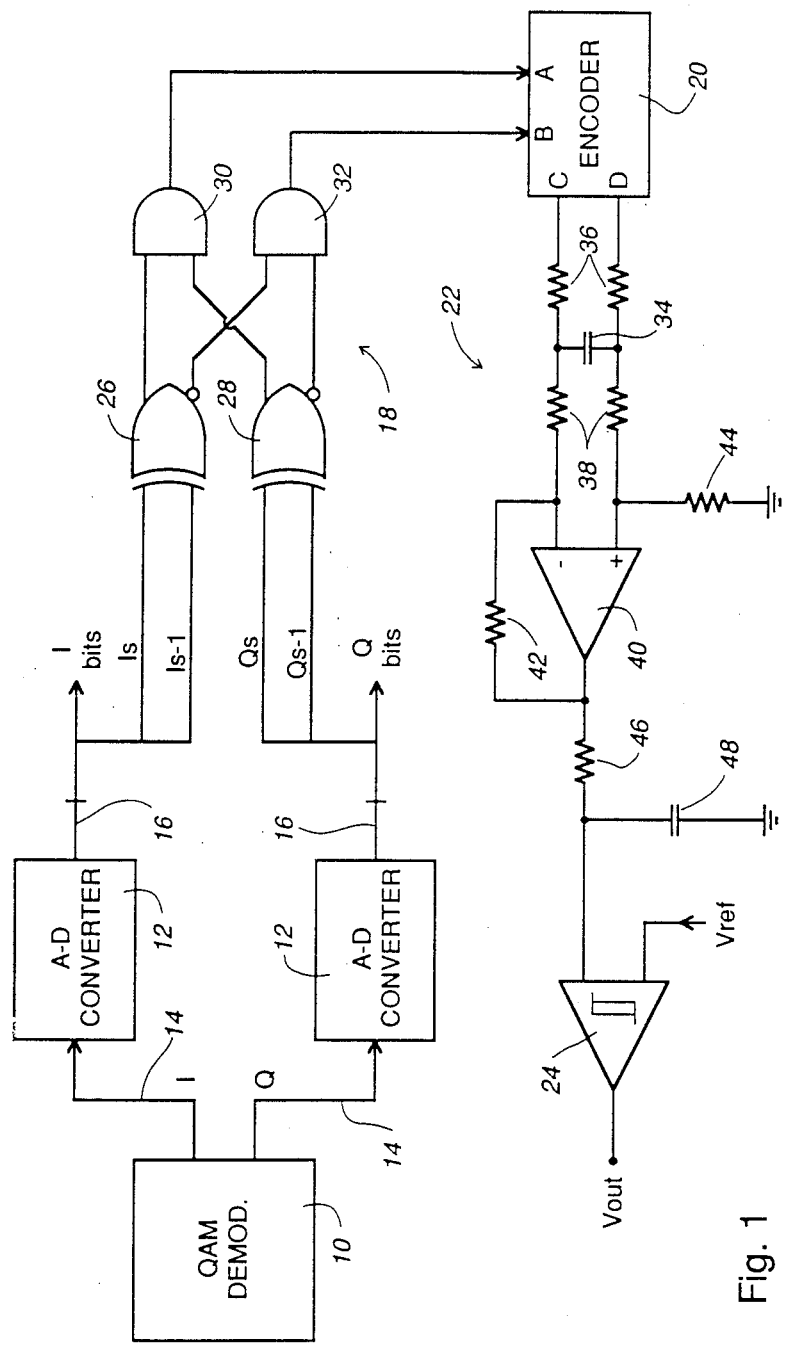
FIG. 1 illustrates a circuit diagram of a carrier lock detector in accordance with this invention.

Referring to FIG. 1, there is illustrated a carrier lock detector in accordance with this invention in conjunction with conventional parts of a microwave radio communications receiver, comprising a QAM demodulator 10 and analog-to-digital (A-D) converters 12. As is well known, the QAM demodulator 10 demodulates a received QAM signal to produce analog I and Q component signals on respective output lines 14, which signals are converted into multiple-bit digital signals, referred to as I bits and Q bits, on lines 16 by the A-D converters 12.

The number of I bits and Q bits depends on the order of the QAM system. For example, for a 256-QAM or 512-QAM system as described in the Kennard et al. patent and Kennard patent application already referred to, 5 I bits and 5 Q bits are needed to distinguish the 256 or 512 signal points in the circular signal point constellation. As in the Nichols patent already referred to, a further 2 I bits and a further 2 Q bits, referred to here as the bits Is, Is-1, Qs, and Qs-1, are used for operation of the carrier lock detector. Thus for example if the A-D converters 12 are 8 bit converters producing output bits I7 (most significant) to I0 and Q7 (most significant) to Q0, then in this case as described below the bits Is, Is-1, Qs, Qs-1 are constituted by the bits I2, I1, Q2, Q1 respectively.

The carrier lock detector itself comprises, as shown in FIG. 1, a gating circuit 18, an encoder 20 having inputs A and B and outputs C and O, an integrating circuit 22, and a comparator 24. The gating circuit 18 comprises Exclusive-OR gates 26 and 28, which are supplied with the signals Is, Is-1 and Qs, Qs-1 respectively and which have complementary outputs, and AND gates 30 and 32, which are supplied with the non-inverted outputs and inverted outputs, respectively, of the gates 26 and 28 and which have outputs connected to the inputs A and B, respectively of the encoder 20. The encoder 20 is a logic circuit which operates in accordance with the following truth table:

| State | Inputs | | Outputs | |
|---|---|---|---|---|
| | A | B | C | D |
| 1 | 1 | 0 | 1 | 0 |
| 2 | 0 | 1 | 0 | 1 |
| 3 | 0 | 0 | Tri-state (high impedance). | |
| can't occur | 1 | 1 | | |

Thus the encoder 20 produces a logic 1 output at its output C or D whenever state 1 or 2, respectively, occurs. These states are discussed further below with reference to FIG. 2.

The integrating circuit 22 includes an integrating capacitor 34 coupled via resistors 36 to the outputs C and D of the encoder 20 and via resistors 38 to the differential inputs of a differential amplifier 40, having a negative feedback resistor 42 and a resistor 44 between its non-inverting input and ground, and having a smoothing circuit comprising a resistor 46 and a capacitor 48 coupled to its output. The resistors 42 and 44 have the same resistance, and the resistors 36, 38 all have half this resistance. The comparator 24 compares the smoothed output of the integrating circuit 22 with a reference voltage Vref to produce an output Vout which constitutes a carrier lock indication signal.

Figure 2:
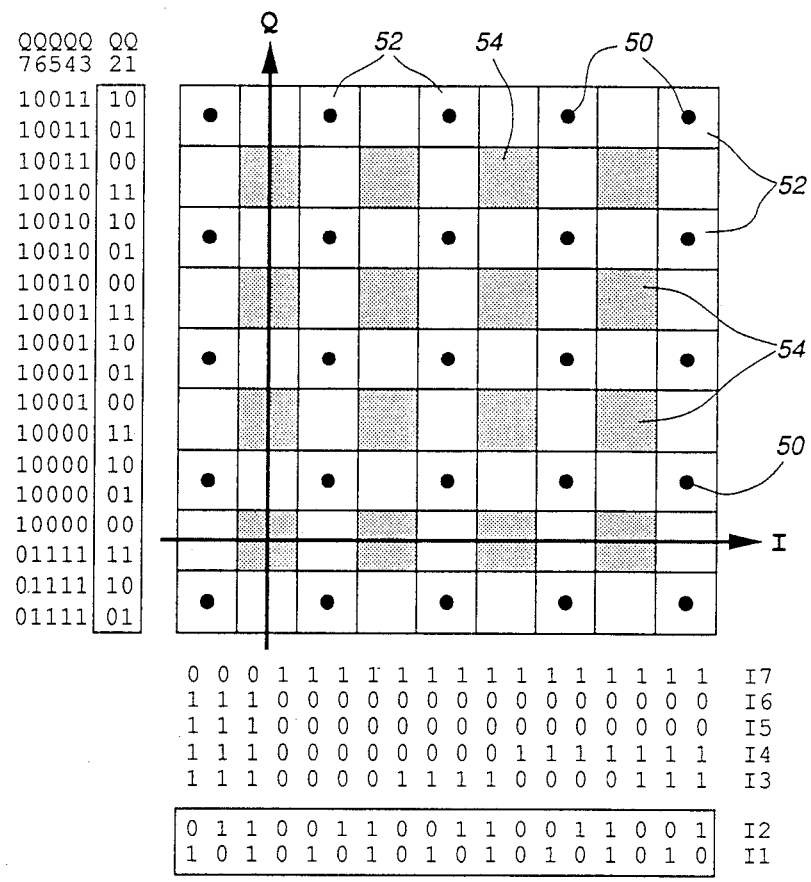
FIG. 2 illustrates part of a QAM signal point constellation with reference to which operation of the carrier lock detector is explained.

Referring to FIG. 2, part of a signal point constellation, plotted in a phase plane diagram with axes I and Q, is illustrated, showing signal points 50 whose I and Q component amplitudes are represented by I bits I7 to I3 and Q bits Q7 to Q3. FIG. 2 also shows the less significant bits I2, I1, Q2 Q1, corresponding to the bits Is, Is-1, Qs, Qs-1 respectively of FIG. 1. The signal points 50 are, as already described above, arranged in a rectangular array within a circular boundary containing, in this example, 256 or 512 signal points.

Each signal point is ideally positioned at the center of a square area or cell 52 for which the bits Is and Is-1, and the bits Qs and Qs-1, have opposite binary values. For I and Q amplitudes within any cell 52, it can be seen that the AND gate 30 will receive binary 1 inputs from the gates 26 and 28 to produce a binary 1 input A to the encoder 20, corresponding to state I of the truth table above.

Conversely square areas or cells 54 which are shown with a dotted fill in FIG. 2 have similar bits Is and Is-1 and similar bits Qs and Qs-1, so that they correspond to state 2 in the truth table above, with the AND gate 32 supplying a binary I to the encoder input B. The remaining squares or cells, shown blank in FIG. 2, correspond to state 3 in the truth table, for which the encoder 20 outputs C and D have a high impedance.

It can be seen from the above description that each time a detected signal point corresponds to state I, i.e. is in a cell 52, the encoder output C is 1 to drive the integrating circuit 22 in one direction, and each time a detected signal point corresponds to state 2, i.e. is in a diagonally offset cell 54, the encoder output D is 1 to drive the integrating circuit 22 in the opposite direction. The output of the integrating circuit 22 is thus an integrated difference between the number, or probability P1, of detected signal points occurring in cells 52 and the number, or probability P2, of detected signal points occurring in cells 54. This integrated probability difference is compared with the reference voltage Vref to produce the carrier lock indication Vout.

Because the cells 52 and 54 are of equal area and are distributed uniformly throughout the phase plane diagram, with the cells 52 centered on the signal points 50 and the cells 54 diagonally offset therefrom, the probabilities P1 and P2 are almost equal when the carrier is unlocked. With the resistors 36 having equal resistances, the integrating capacitor 34 is therefore charged in one direction, and discharged or charged in the opposite direction, by equal amounts on average in this carrier unlocked state, so that on average its charge is substantially zero when the carrier is unlocked.

Figure 3A:
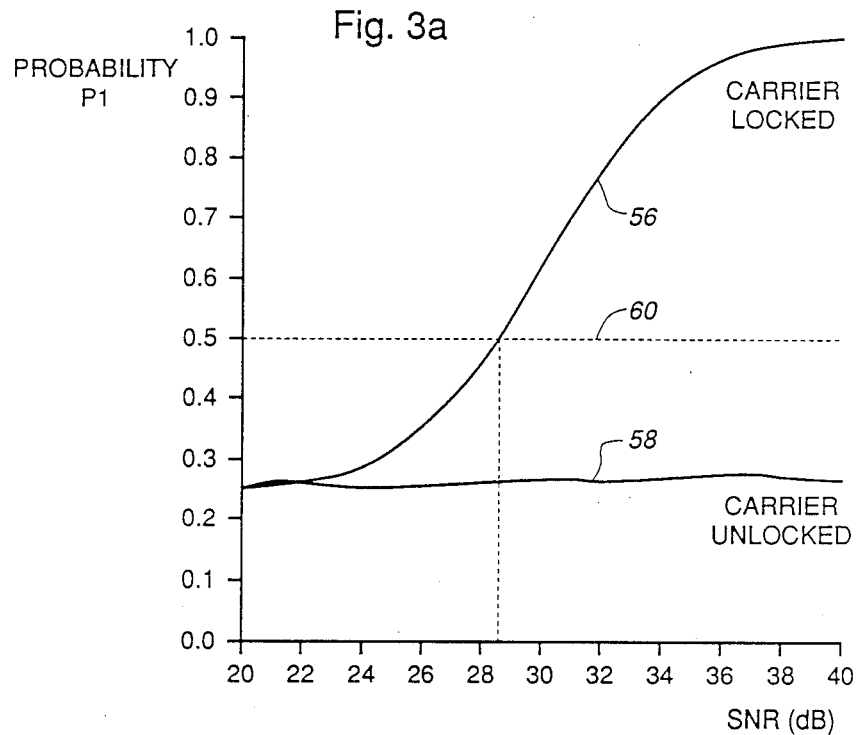
FIGS. 3a and 3b are illustrations of simulated results of operation of carrier lock detectors, respectively of known form and in accordance with this invention, applied to a 512-QAM system.
Figure 3B:
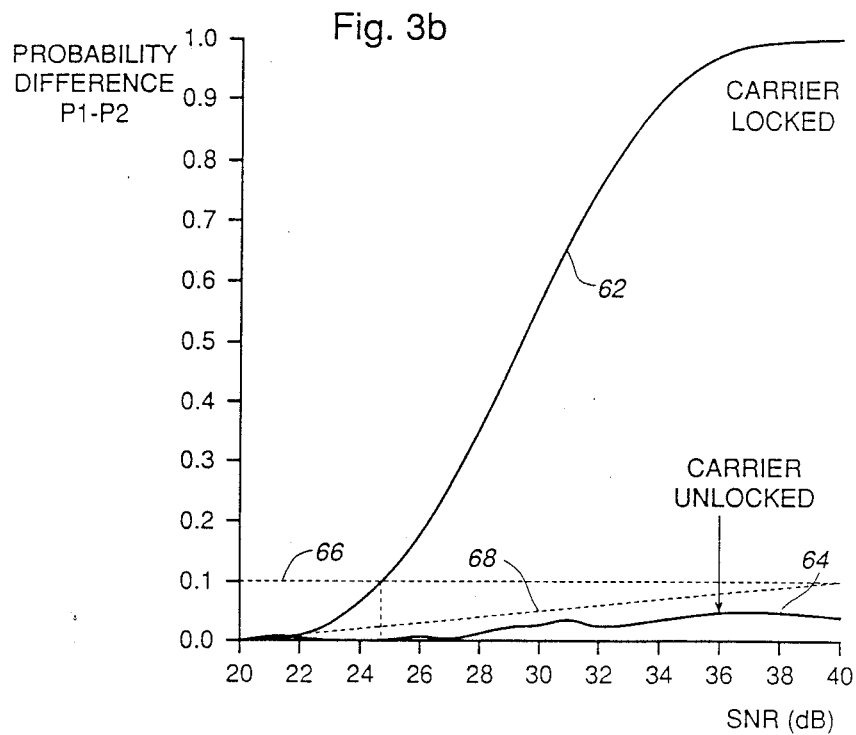

FIGS. 3a and 3b illustrate the improvement in operation provided by the invention over the known arrangement described in the Nichols patent already referred to, for a 512-QAM system. A similar improvement exists for other orders of QAM. FIG. 3a relates to the performance of the known arrangement but is not acknowledged as prior art because the known arrangement is not described or illustrated in this manner. FIG. 3b relates to the arrangement of FIG. 1.

In FIG. 3a, a curve 56 shows as a function of SNR the probability P1, which is detected in the known arrangement of the Nichols patent, that detected signal points will occur in the cells 52 when the carrier is locked, and a curve 58 shows the corresponding probability when the carrier is not locked. As the cells 52 occupy a quarter of the area of the phase plane diagram, the curve 58 is fairly constant around a probability of 0.25, whereas the curve 56 rises from this level to a probability of 1 with increasing SNR, and hence increasingly precise detection of signal points in the centers of the cells 52. The known arrangement as described in the Nichols patent monitors for "good" indications more than half the time, corresponding to a threshold probability level of 0.5 as shown by a broken line 60 in FIG. 3a. For the 512-QAM system, this intersects the curve 56 at a SNR of about 29 dB. Thus for SNR>29 dB the known carrier lock detector is effective, but for SNR<29 dB it fails to detect carrier lock.

In contrast, in FIG. 3b curves 62 and 64 show over the same range of SNR for the 512-QAM system the probability difference P1−P2 which is monitored by the above-described carrier lock detector, with the carrier locked and unlocked respectively. As the carrier unlocked state can be envisaged as a state in which the detected signal point positions rotate about the origin of the phase-plane diagram (intersection of the I and Q axes), it can be seen that the probabilities P1 and P2 of the detected signal points occurring in the cells 52 and 54 respectively are substantially equal, so that the probability difference P1−P2 is substantially zero. Thus in FIG. 3b the carrier unlocked curve 64 is around a probability difference level of 0. The carrier locked curve 62 rises from this level to a probability difference of 1 (all the detected signal points are in the cells 52, none in the cells 54) with increasing SNR.

In contrast to the known arrangement, in which the threshold level 60 is fixed at 0.5, in the detector of FIG. 1 the threshold level is determined by the reference voltage Vref and can be set at a much lower probability difference level, as long as this is above the carrier unlocked curve 64 to enable the detector to distinguish between the carrier locked and unlocked states. For example, FIG. 3b illustrates by a broken line 66 a probability difference threshold level, corresponding to a fixed value of Vref, which is well above the curve 64 for all values of SNR. This level 66 intersects the curve 62 at a SNR of about 25 dB, so that with such a setting the carrier lock detector operates at all SNR levels above this. This corresponds to an improvement of about 4 dB over the known arrangement.

Thus the use of the probability difference P1−P2 in the embodiment of the invention described above increases, to substantially the largest possible extent, the separation between the carrier locked curve 62 and the carrier unlocked curve 64, thereby facilitating the setting of the reference voltage Vref to an optimal value.

Although as described above the threshold level line 66 is constant for all values of SNR, it can conceivably be made variable as a function of SNR in order to further distinguish between the carrier locked and unlocked states. For example, FIG. 3b illustrates by a straight line 68 a possible variation of the threshold level with SNR, enabling a clear distinction to be made between the carrier locked and unlocked states down to an even lower level of SNR, about 22 dB. Such a variable threshold level can be provided by varying the reference voltage in dependence upon a parameter which varies with SNR.

In addition, although as described above the probability difference P1-P2 is monitored by the carrier lock detector, with suitable weighting other probability differences could be substituted, as long as the probability difference which is monitored changes substantially over the full range between 0 and 1 to provide the maximum possible separation between carrier locked and unlocked states. For example, the detector circuit of FIG. 1 can be modified by eliminating the gate 32 and encoder 20, connecting the output of the gate 30 directly to one input and via an inverter to the other input of the integrating circuit 22, and modifying the weighting of the resistors 36 and 38 so that the capacitor 34 is charged in one direction at one rate, corresponding to a detected signal point being within a cell 52, and discharged in the opposite direction at one third of this rate, corresponding to a detected signal pint not being within a cell 52.

Additionally, although as described above the cells 52 and 54 are rectangular (in fact, square) and defined by two less significant I bits I2, I1, and two less significant Q bits Q2, Q1, so that the occurrence of signal points within these cells can be easily determined using the Exclusive-OR gates, this need not be the case. Instead, the cells 52 could be non-rectangular areas, for example each shaped as a +, centered on the signal points 50, with the cells 54 partially or fully filling the areas therebetween, and these cells could be defined using further less significant I and Q bits, for example third bits I0 and Q0 (not shown). In such a case, the gating circuit 18 would be modified to reflect the modified cell shapes, and could for example be constituted by a more complex logic circuit or a programmed logic array.

Although an analog integrating circuit 22 and comparator 24 are described separately above for easily understanding the principle, the functions of these components can be combined using a single differential amplifier. Furthermore, the analog integrating circuit 22 and comparator 24 can be replaced by a digital integrating circuit such as a counter and a digital comparator, respectively.

Numerous other modifications, variations, and adaptations can be made to the above described embodiment of the invention without departing from the scope of the invention as defined in the claims.

What is claimed is:

1. A carrier lock detector for a QAM system having signal points identified by a plurality of I bits and a plurality of Q bits respectively representing in-phase and quadrature-phase component amplitudes in a phase plane diagram, the phase plane diagram including first areas centered on respective signal points and second areas between the first areas, the detector comprising:

means (18) responsive to a plurality of less significant I bits (I2, I1) and a plurality of less significant Q bits (Q2, Q1) for producing a first signal (30 output) when a detected signal is in one of the first areas (52) and a second signal (32 output) when a detected signal is in one of the second areas (54);

means (20, 22) for producing an integrated difference of the first and second signals; and means (24) for comparing the integrated difference with a threshold level to provide a carrier lock detection signal.

2. A detector as claimed in claim 1 wherein the means (18) responsive to the less significant I and Q bits comprises Exclusive-OR gating means (26) responsive to two less significant I bits (I2, I1), Exclusive-OR gating means (28) responsive to two less significant Q bits (Q2, Q1), and AND gating means (30) responsive to outputs of the two Exclusive-OR gating means for producing the first signal.

3. A detector as claimed in claim 2 wherein the means (18) responsive to the less significant I and Q bits further comprises AND gating means (32) responsive to inverted outputs of the two Exclusive-OR gating means for producing the second signal.

4. A detector as claimed in claim 1 wherein the means (20, 22) for producing an integrated difference of the first and second signals comprises a capacitor (34) and means (20, 36) for changing a charge of the capacitor in a first direction in response to the first signal and in a second, opposite, direction in response to the second signal.

5. A detector as claimed in claim 1 wherein the means (20, 22) for producing an integrated difference of the first and second signals is arranged for producing a substantially zero integrated difference in a carrier unlocked state of the QAM system.

6. A method of detecting carrier lock in a QAM system in which signal points are identified by a plurality of I bits and a plurality of Q bits respectively representing in-phase and quadrature-phase component amplitudes in a phase plane diagram, comprising the steps of:

monitoring a plurality of less significant I bits and a plurality of less significant Q bits to produce a first signal when a detected QAM signal is in one of first areas of the phase plane diagram centered on respective signal points and to produce a second signal when a detected QAM signal is in one of second areas of the phase plane diagram between and distinct from the first areas;

providing an integrated difference of the first and second signals; and comparing the integrated difference with a threshold level to provide a carrier lock detection signal.

7. A method as claimed in claim 6 wherein the second areas are diagonally offset from the first areas and are the same size as the first areas.

8. A method as claimed in claim 6 wherein the step of providing an integrated difference of the first and second signals comprises providing a substantially zero integrated difference in a carrier unlocked state of the QAM system.

9. A method as claimed in claim 7 wherein the step of providing an integrated difference of the first and second signals comprises providing a substantially zero integrated difference in a carrier unlocked state of the QAM system.

* * * * *